(12) United States Patent
Chang et al.

(10) Patent No.: US 8,587,586 B2
(45) Date of Patent: Nov. 19, 2013

(54) ELECTRONIC DEVICE AND METHOD FOR MESHING CURVED SURFACE

(75) Inventors: Chih-Kuang Chang, New Taipei (TW); Xin-Yuan Wu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 195 days.

(21) Appl. No.: 13/327,780

(22) Filed: Dec. 16, 2011

(65) Prior Publication Data

US 2012/0287128 A1 Nov. 15, 2012

(30) Foreign Application Priority Data

May 11, 2011 (CN) .......................... 2011 1 0120975

(51) Int. Cl.
*G06T 15/30* (2011.01)
*G06T 15/00* (2011.01)
(52) U.S. Cl.
USPC .......................................... 345/423; 345/419
(58) Field of Classification Search
None
See application file for complete search history.

(56) References Cited

U.S. PATENT DOCUMENTS

| 6,256,038 | B1 * | 7/2001 | Krishnamurthy | 345/419 |
| 6,819,966 | B1 * | 11/2004 | Haeberli | 700/98 |
| 2009/0058853 | A1 * | 3/2009 | Chang et al. | 345/423 |

* cited by examiner

*Primary Examiner* — Kee M Tung
*Assistant Examiner* — Yi Wang
(74) *Attorney, Agent, or Firm* — Altis & Wispro Law Group, Inc.

(57) ABSTRACT

In a method for creating a mesh over a curved surface of an electronic model of an object using an electronic device, sampled points of a boundary line of the electronic model of the object are obtained. The method stores the sampled points of the boundary line in a linked list, obtains sampled points of the curved surface of the electronic model of the object, stores the sampled points of the curved surface in a first queue, and inserts each point stored in the linked list into the first queue. The method further divides a parameter plane of the curved surface into small boxes, determines intersection points of the vertical lines of the parameter plane and the boundary line, and generates triangles by connecting the intersection points, the sampled points of the boundary line, and the curved surface in each small box.

20 Claims, 14 Drawing Sheets

ELECTRONIC DEVICE AND METHOD FOR MESHING CURVED SURFACE

BACKGROUND

1. Technical Field

Embodiments of the present disclosure relate to computer aided design technology, and particularly to an electronic device and method for meshing a curved surface of an electronic model of an object using the electronic device.

2. Description of Related Art

A three-dimensional (3D) scanner captures geometric information of a 3D object by gathering points at a high resolution representing the shape of the 3D object. Once captured, raw 3D scan data may be converted into a CAD model for further processing to replicate or modify a design of the 3D object in a process referred to as reverse engineering.

A 3D model of an object may be represented by a plurality of freeform curved surfaces. The curved surfaces may be represented by either a plurality of points or by dense triangular or other types of meshes which cumulatively form the outline of the 3D object. At present, the 3D model may be used as a standard to measure the object by moving/zooming/rotating the 3D model using image measuring methods. However, the moving/zooming/rotating speed is very slow because an inordinate number of triangles are produced by the method, and a great deal of time is required. Therefore, a more efficient method for superimposing a virtual mesh on a curved surface of an electronic representation/model of an object is desired.

DETAILED DESCRIPTION

All of the processes described below may be embodied in, and fully automated via, functional code modules executed by one or more general purpose electronic devices or processors. The code modules may be stored in any type of non-transitory computer-readable medium or other storage device. Some or all of the methods may alternatively be embodied in specialized hardware. Depending on the embodiment, the non-transitory computer-readable medium may be a hard disk drive, a compact disc, a digital video disc, a tape drive or other suitable storage medium.

Figure 1:
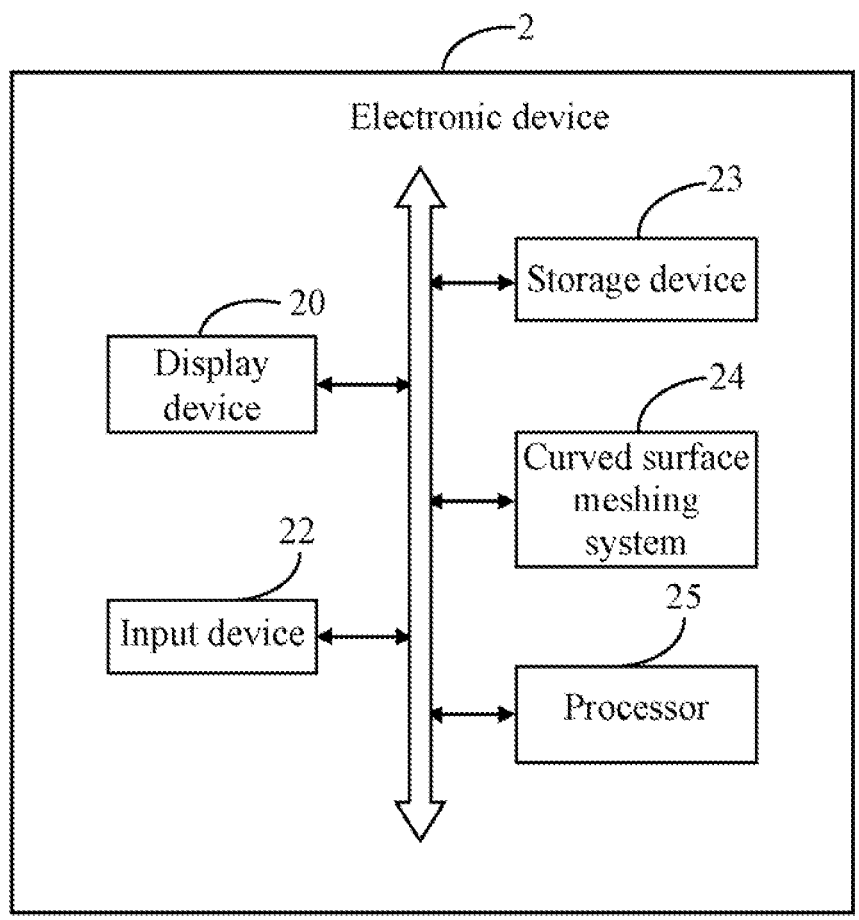
FIG. 1 is a block diagram of one embodiment of an electronic device including a curved surface meshing system.

FIG. 1 is a block diagram of one embodiment of an electronic device 2 including a curved surface meshing system 24. In the embodiment, the electronic device 2 further includes a display device 20, an input device 22, a storage device 23, and at least one processor 25. The electronic device 2 may be a computer, a server, or other computing device. It should be understood that FIG. 1 illustrates only one example of the electronic device 2, other examples may include more or fewer components than illustrated, or have a different configuration of the various components.

The display device 20 may be a liquid crystal display (LCD) or a cathode ray tube (CRT) display, and the input device 22 may be a mouse, a keyboard, a touch screen, and/or a touchpad used for user input.

Figure 9:
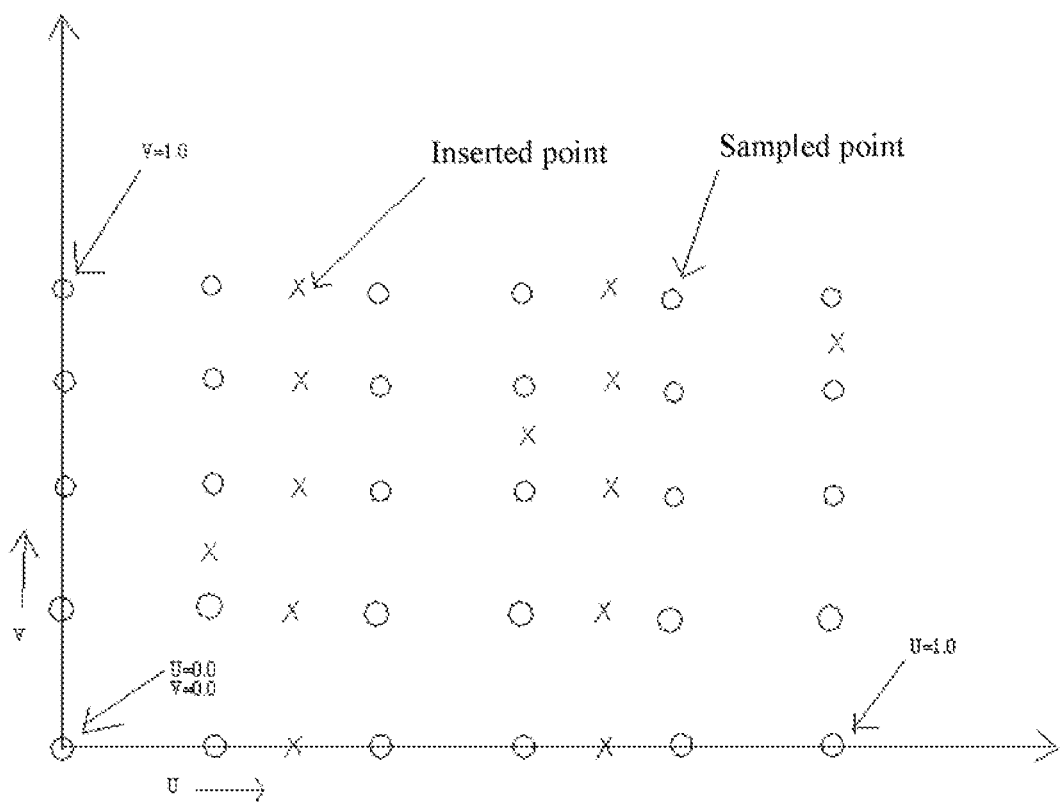
FIG. 9 is an exemplary schematic diagram showing the processing in block S3.

The storage device 23 stores information about a curved surface of an electronic model of an object, such as a parametric equation (e.g. $x=j(u, v)$, $y=\psi(u, v)$, $z=c(u, v)$) and a complete three-dimensional (3D) model of the object. The storage device 23 is further used to store information generated by the parametric equation for the curved surface, such as an area of each of the curved surface, a mapping relationship of 3D points on the curved surface and two-dimensional (2D) points in a parameter plane of the curved surface, and a parametric equation (e.g. $x=j(u,v)$, $y=\psi(u,v)$, $0<u,v<=1$). In the embodiment, the U-axis represents a horizontal direction, and the V-axis represents a vertical direction on the parameter plane (as shown in FIG. 9).

The curved surface meshing system 24 constructs a mesh of triangles based on the 3D model of the object, and displays the mesh on the display device 20. In one embodiment, the curved surface meshing system 24 may include computerized instructions in the form of one or more programs that are executed by the at least one processor 25 and stored in the storage device 23 (or memory). A detailed description of the curved surface meshing system 24 will be given.

Figure 2:
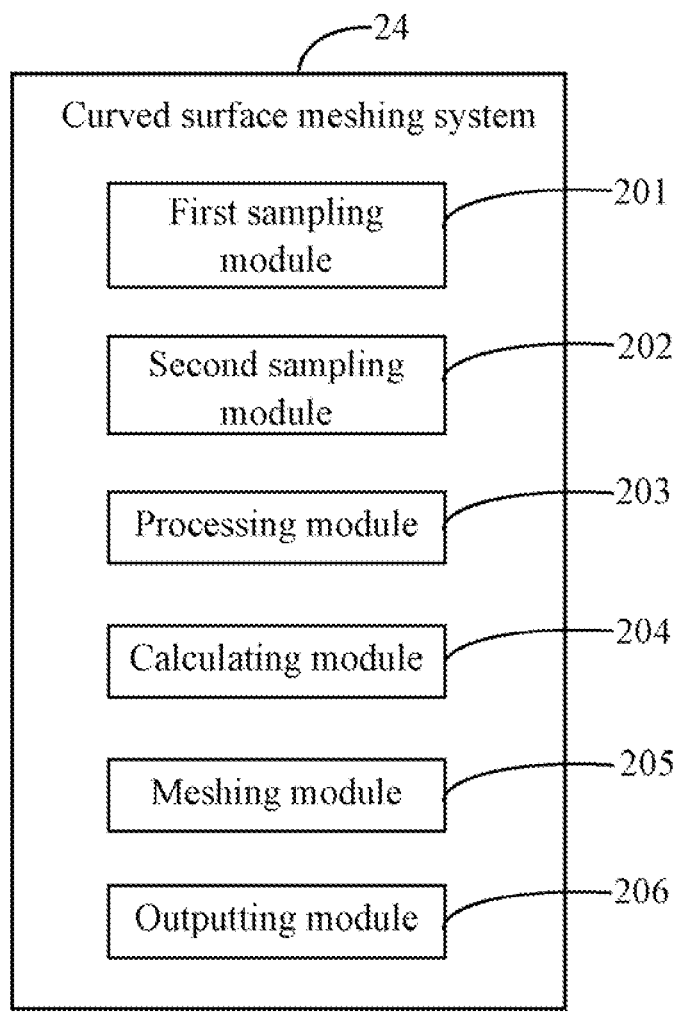
FIG. 2 is a block diagram of function modules of the curved surface meshing system included in the electronic device of FIG. 1.

FIG. 2 is a block diagram of function modules of the curved surface meshing system 24 included in the electronic device 2. In one embodiment, the curved surface meshing system 24 may include one or more modules, for example, a first sampling module 201, a second sampling module 202, a processing module 203, a calculating module 204, a meshing module 205, and an output module 206. In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable medium include CDs, DVDs, BLU-RAY, flash memory, and hard disk drives.

Figure 3:
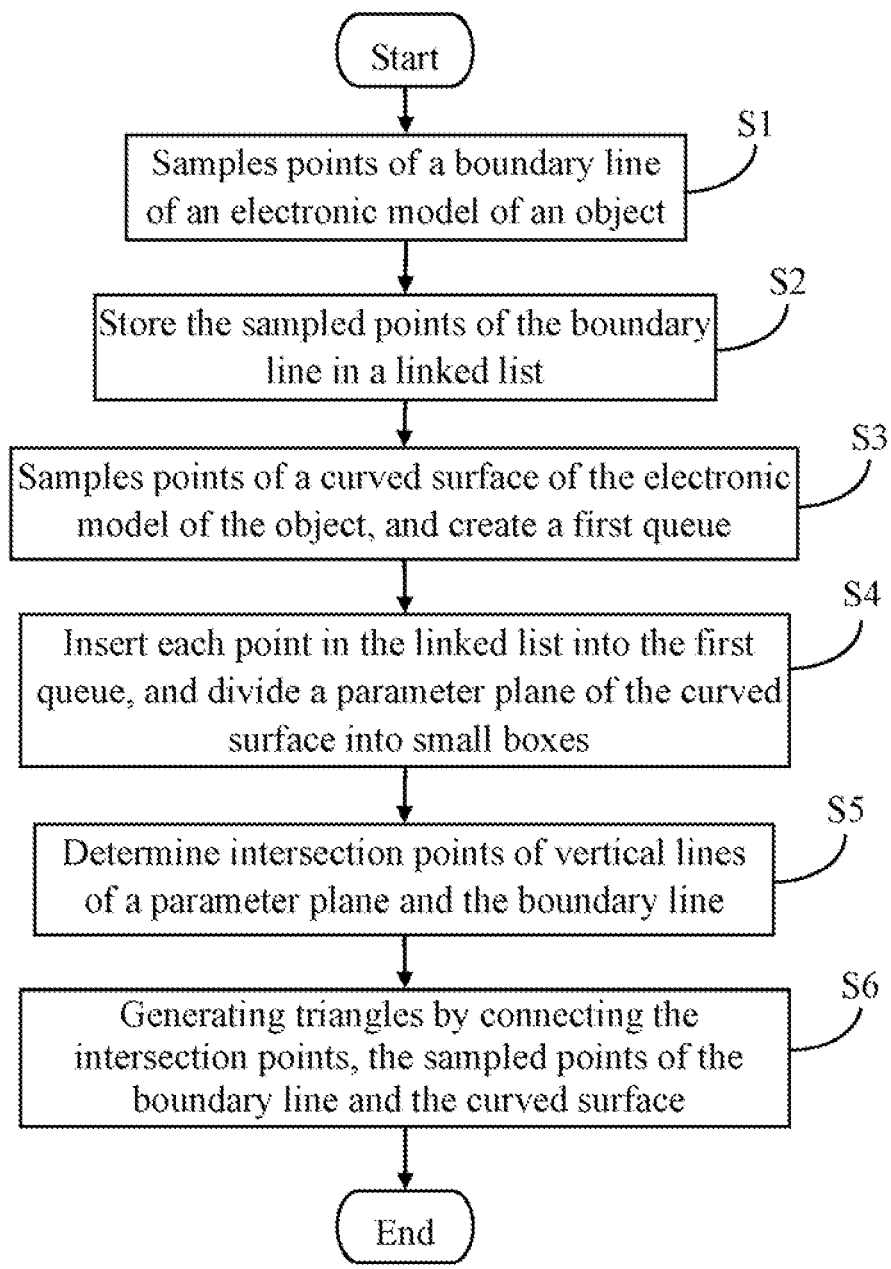
FIG. 3 is a flowchart of one embodiment of a method for meshing a curved surface of an electronic model of an object using the electronic device of the FIG. 1.

FIG. 3 is a flowchart of one embodiment of a method for meshing a curved surface of an electronic model of an object using the electronic device 2. Depending on the embodiment, additional blocks may be added, others removed, and the ordering of the blocks may be changed.

In block S1, the first sampling module 201 samples points of a boundary line of the electronic model of the object from the storage device 23. A detailed description is given in FIG. 4. In one embodiment, the electronic model of the object may includes curved and straight line surfaces and boundaries. The boundary line represents an outline of the electronic model of the object.

In block S2, the first sampling module 201 stores the sampled points of the boundary line in a linked list. A detailed description is given in FIG. 6. In one embodiment, the linked list is a data structure consisting of a group of nodes which together represent a sequence.

In block S3, the second sampling module 202 samples points of a curved surface of the electronic model of the object, and stores the sampled points of the curved surface in a first queue. A detailed description is given in FIG. 8.

In block S4, the processing module 203 inserts each point of the boundary line in the linked list into the first queue, and divides the parameter plane of the curved surface into a plurality of small boxes by means of vertical lines ("V-lines") of the parameter plane. A detailed description is given in FIG. 10. In one embodiment, the small boxes are a plurality of sub-areas of the parameter plane of the curved surface, such as box1, box2, box3, box4, and box5 in FIG. 11.

In block S5, the calculating module 204 determines intersection points of the vertical lines of the parameter plane and the boundary line.

In block S6, triangles are generated by the meshing module 205 connecting the intersection points, the sampled points of the boundary line and the curved surface in each small box, so as to construct a mesh of triangles of the curved surface of the electronic model of the object. Further, the triangle mesh of the curved surface may be displayed on the display device 20. A detailed description is given in FIG. 12.

Figure 11:
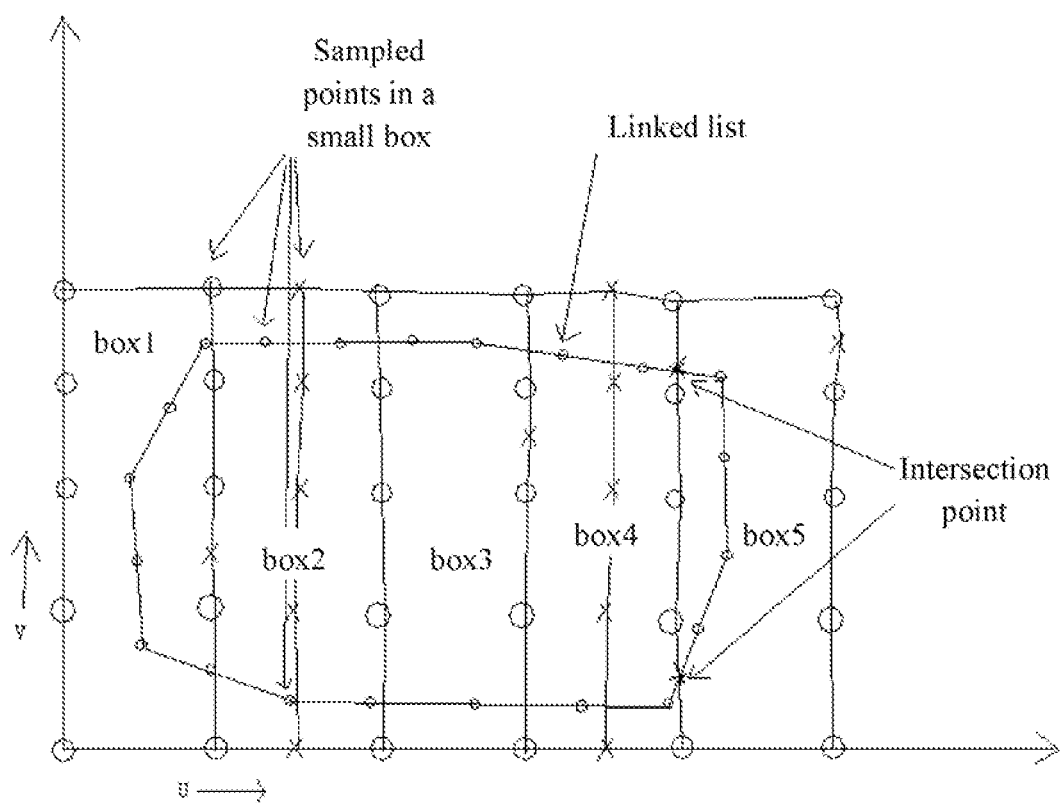
FIG. 11 is an exemplary schematic diagram showing the processing in block S4.

In this embodiment, in block S4, the processing module 203 divides the parameter plane of the curved surface into the small boxes by the vertical lines of the parameter plane (as shown in FIG. 11), which reduces a quantity of the intersection points generated in block S6. Thus, in block S6, an appropriate amount of well-proportioned triangles in a mesh of triangles can have been constructed quickly by the current curved surface meshing method, to improve the speed and precision of curved surface triangulation.

In other embodiments, the outputting module 206 maps 2D points on the triangles having horizontal and vertical (U, V) coordinates to 3D points having X, Y, Z coordinates, according to the parametric equation of the curved surface, and outputs a triangulated curved surface of the electronic model of the object on the display device 20, according to the X, Y, Z coordinates of the 3D points of each of the triangles.

Figure 4:
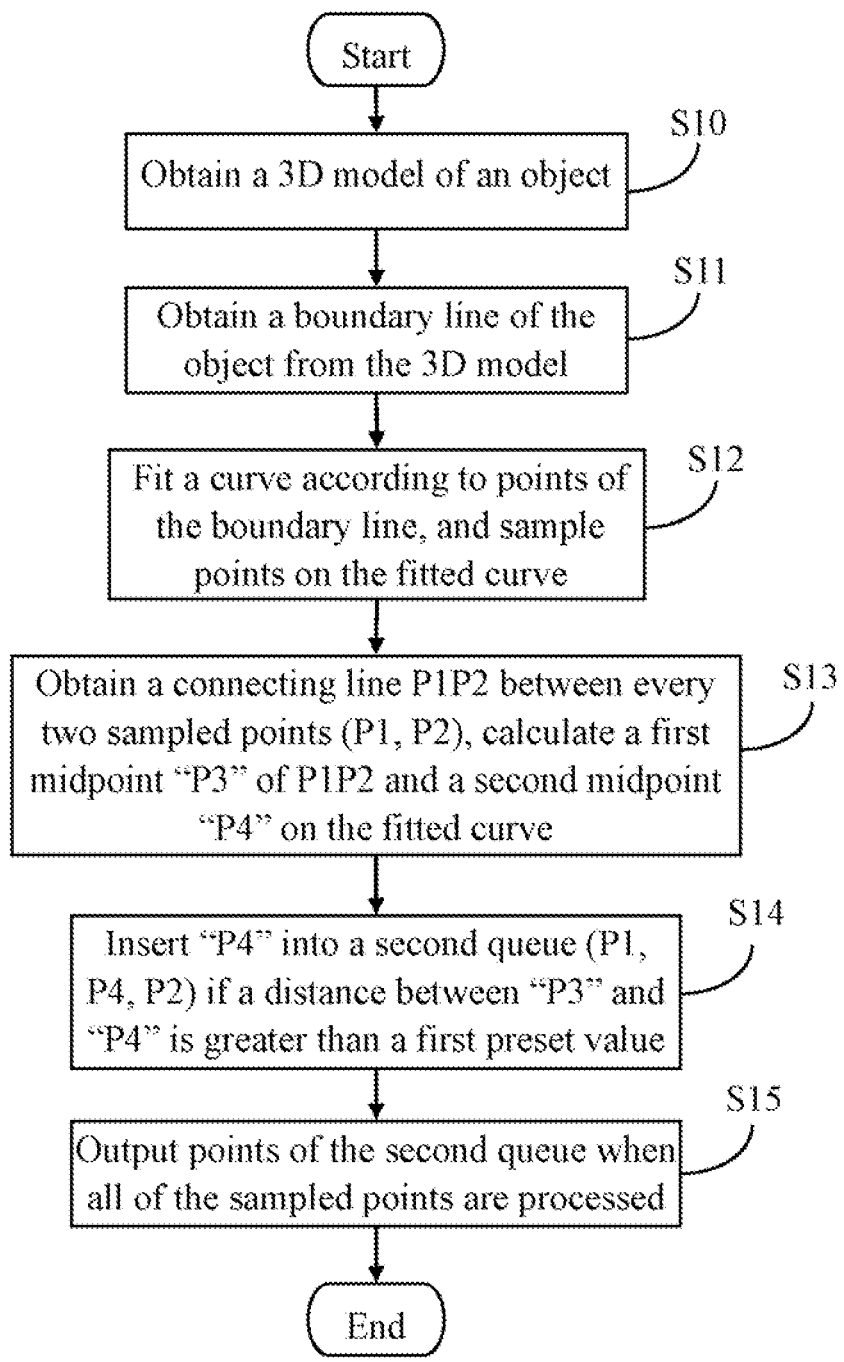
FIG. 4 is a detailed flowchart of block S1 in FIG. 3.

FIG. 4 is a detailed flowchart of block S1 in FIG. 3. Depending on the embodiment, additional blocks may be added, others removed, and the ordering of the blocks may be changed.

In block S10, the first sampling module 201 obtains the 3D model of the object from the storage device 23.

In block S11, the first sampling module 201 obtains a boundary line of the object from the 3D model.

In block S12, the first sampling module 201 fits a curve according to points of the boundary line, and samples points in the fitted curve.

Figure 5:
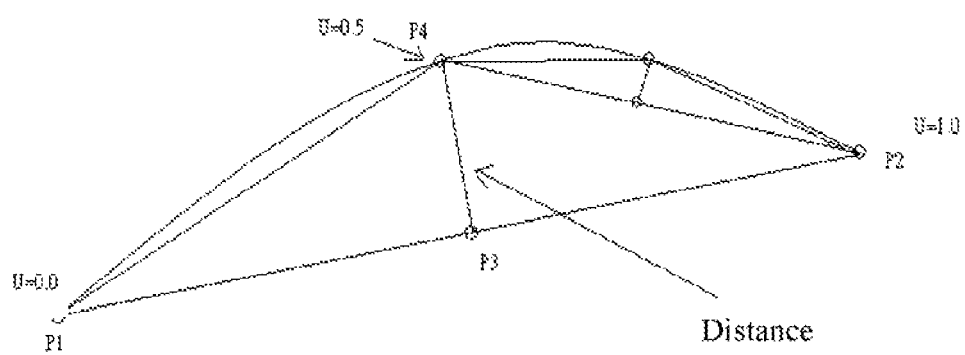
FIG. 5 is an exemplary schematic diagram showing the processing in block S1.

In block S13, the first sampling module 201 obtains a connecting line "P1P2" between every two sampled points (P1, P2) on the fitted curve, calculates a first midpoint "P3" of the connecting line and a second midpoint "P4" between the two sampled points (P1, P2) on the fitted curve (refer to FIG. 5).

In block S14, the first sampling module 201 inserts the second midpoint "P4" into a second queue (P1, P4, P2, . . . ) if a distance between the first midpoint "P3" and the second midpoint "P4" is greater than a first preset value (e.g., 0.5 millimeters).

In another embodiment, the first sampling module 201 may repeat blocks S13 and S14 according to the two points of (P1, P4) and/or (P4, P2) until the calculated distance is less than or equal to the first preset value. For example, supposing that a midpoint of a connecting line "P1P4" between the two points (P1, P4) is "P5", and a midpoint of the two points (P1, P4) on the fitted curve is "P6." If a distance between the midpoints "P5" and "P6" is greater than the first preset value, the first sampling module 201 inserts the midpoint "P6" into the second queue (P1, P6, P4, P2, . . . ). If the distance between the midpoints "P5" and "P6" is less than or equal to the first preset value, the repeating operation ends. The repeating operation of the two points (P4, P2) is similar to the two points (P1, P4).

In block S15, the first sampling module 201 outputs points of the second queue when all of the sampled points of the fitted curve have been processed.

Figure 6:
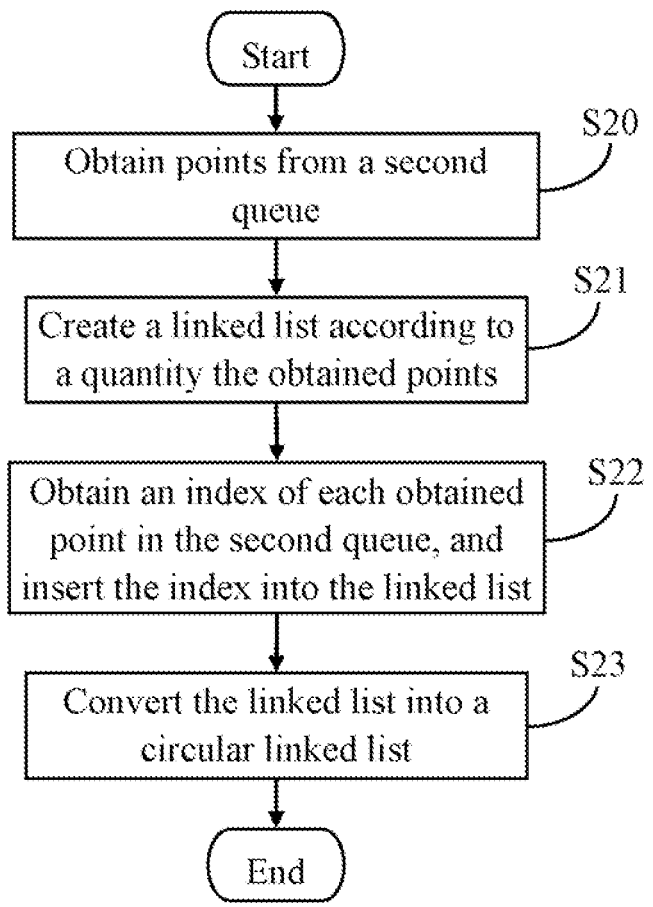
FIG. 6 is a detailed flowchart of block S2 in FIG. 3.

FIG. 6 is a detailed flowchart of block S2 in FIG. 3. Depending on the embodiment, additional blocks may be added, others removed, and the ordering of the blocks may be changed.

In block S20, the first sampling module 201 obtains a plurality of points from the second queue.

In block S21, the first sampling module 201 creates a linked list depending on a quantity of the obtained points. In one embodiment, a number of nodes in the linked list equals the quantity of the obtained points.

Figure 7:
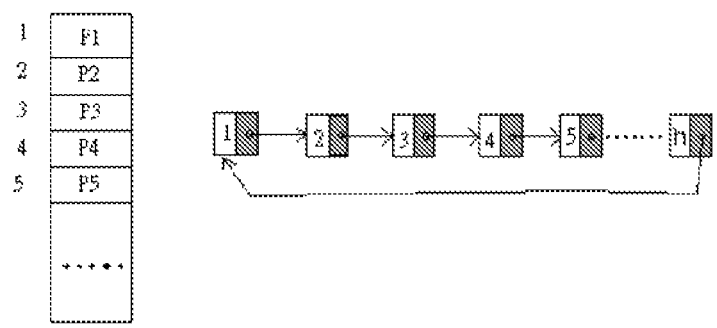
FIG. 7 is an exemplary schematic diagram showing the processing in block S2.

In block S22, the first sampling module 201 obtains an index of each obtained point in the second queue, and inserts the index into the linked list. For example, as shown in FIG. 7, an index value of a point "P1" is "1," thus the index value "1" is inserted into the linked list.

In block S23, the first sampling module 201 converts the linked list into a repeating and endless list (circular listed list). It should be understood that, in the circular listed list, the last node points to the first node of the list (as shown in FIG. 7).

Figure 8:
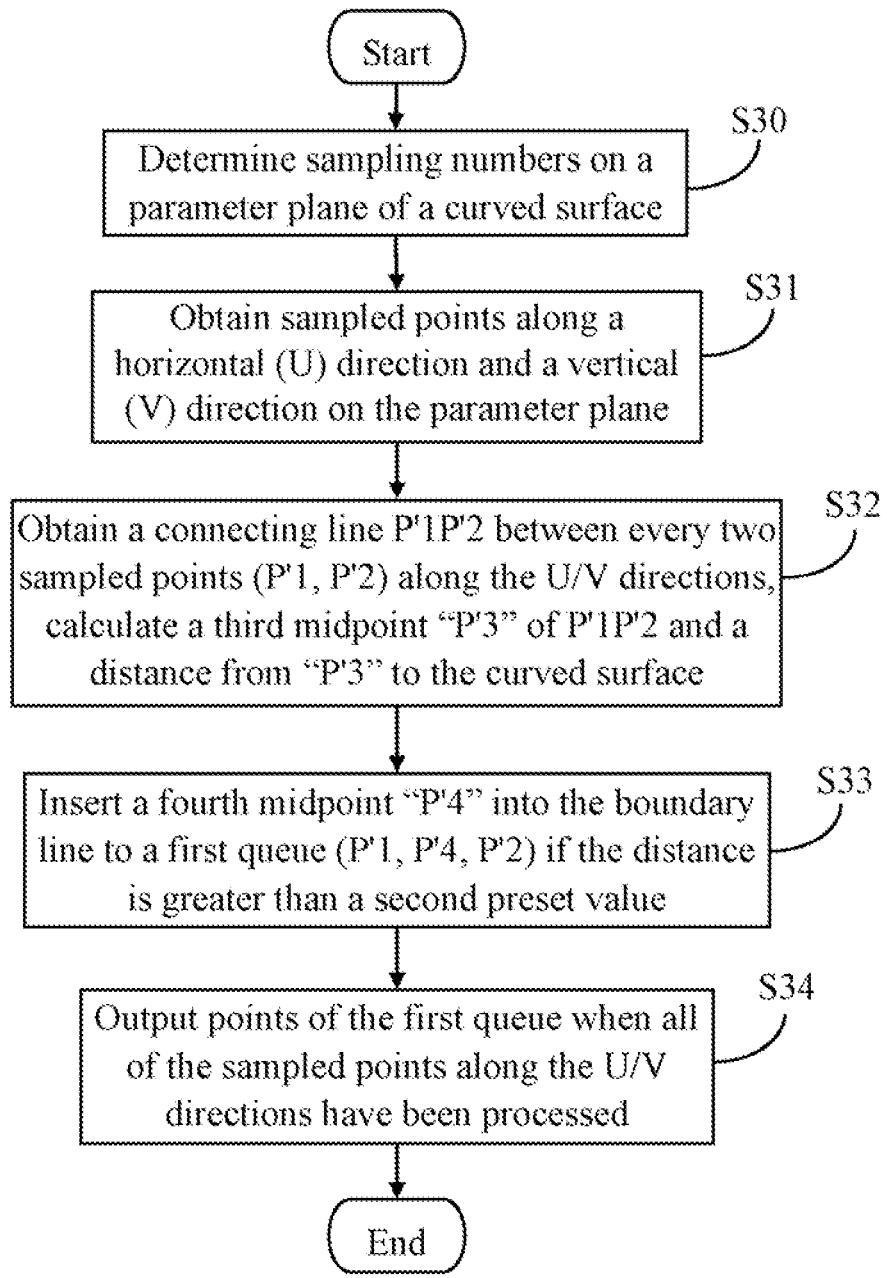
FIG. 8 is a detailed flowchart of block S3 in FIG. 3.

FIG. 8 is a detailed flowchart of block S3 in FIG. 3. Depending on the embodiment, additional blocks may be added, others removed, and the ordering of the blocks may be changed.

In block S30, the second sampling module 202 determines sampling numbers along a horizontal direction and a vertical direction on the parameter plane of the curved surface. For example, a sampling number along the horizontal direction may be 6, and a sampling number along the vertical direction may be 5.

In block S31, the second sampling module 202 obtains sampled points along the horizontal direction and the vertical direction on the parameter plane according to the sampling numbers along the horizontal and vertical directions (as shown in FIG. 9).

In block S32, the second sampling module 202 obtains a connecting line "P'1P'2" between every two sampled points along the horizontal and vertical directions, calculates a third midpoint "P'3" of the connecting line "P'1P'2" and further calculates a distance from the third midpoint "P'3" to the curved surface.

In block S33, the second sampling module 202 determines a fourth midpoint "P'4" between the two sampled points (P'1, P'2) on the boundary line, and inserts the fourth midpoint "P'4" into the first queue (P'1, P'4, P'2, . . . ) if the distance is greater than a second preset value (e.g., one millimeter).

In another embodiment, the second sampling module 202 may repeat blocks S32 and S33 according to the two points of (P'1, P'4) and/or (P'4, P'2) until the calculated distance is less than or equal to the second preset value. For example, supposing that a midpoint of a connecting line "P'1P'4" between the two points (P'1, P'4) is "P'5", a midpoint of the two points (P'1, P'4) on the boundary line is "P'6." If a distance from the midpoints "P'5" to the curved surface is greater than the second preset value, the second sampling module 201 inserts the midpoint "P'6" to the first queue (P'1, P'6, P'4, P'2, ... ). If the distance from the midpoints "P'5" to the curved surface is less than or equal to the second preset value, the repeating operation ends. The repeating operation of the two points (P'4, P'2) is similar to that of the two points (P'1, P'4).

In block S34, the second sampling module 202 outputs points of the first queue when all of the sampled points along the horizontal and vertical directions on the parameter plane have been processed.

Figure 10:
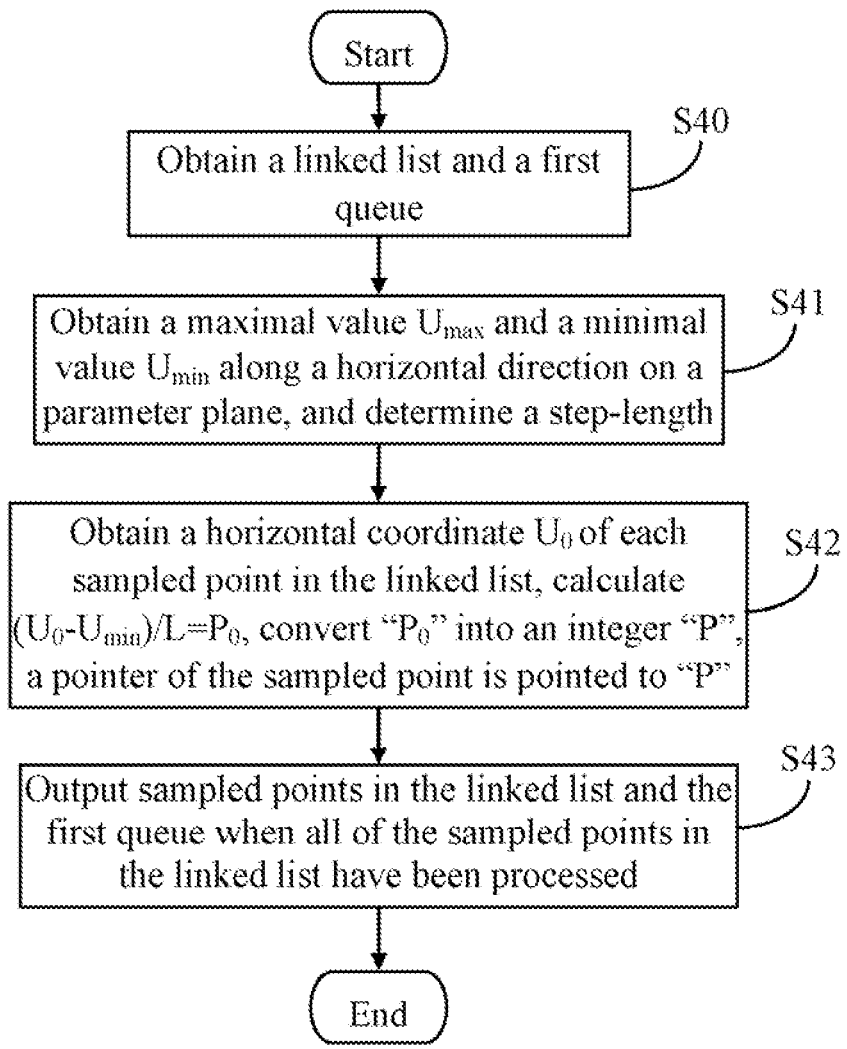
FIG. 10 is a detailed flowchart of block S4 in FIG. 3.

FIG. 10 is a detailed flowchart of block S4 in FIG. 3. Depending on the embodiment, additional blocks may be added, others removed, and the ordering of the blocks may be changed.

In block S40, the processing module 203 obtains the linked list and the first queue.

In block S41, the processing module 203 obtains a maximal value $U_{max}$ and a minimal value $U_{min}$ along the horizontal direction on the parameter plane from the first queue, determines a sampling number $C_0$ along the horizontal direction on the parameter plane, calculates $(U_{max}-U_{min})/C_0=L_0$, converts "$L_0$" into an integer "L" to determine a step-length along the horizontal direction, and divides the parameter plane of the curved surface into a plurality of small boxes by the vertical lines (V-lines) of the parameter plane according to the step-length along the horizontal direction (U-direction).

As shown in FIG. 11, the parameter plane is divided into five small boxes, such as box1, box2, box3, box4, and box5. It should be understood that, in other embodiments, the processing module 203 may divide the parameter plane of the curved surface into a plurality of small boxes by the horizontal lines (U-lines) of the parameter plane according to the step-length along the vertical direction (V-direction).

In block S42, the processing module 203 obtains a horizontal coordinate $U_0$ of each sampled point in the linked list, calculates $(U_0-U_{min})/L=P_0$, converts "$P_0$" into an integer "P", and locates a pointer of the sampled point to a position corresponding to the integer "P". That is to say, the sampled point is located in a small box having a serial number of the integer "P". For example, if P=1, then the sampled point is located in the first small box ("box1").

In block S43, the processing module 203 outputs sampled points in the linked list and the first queue when all of the sampled points in the linked list have been processed.

Figure 12:
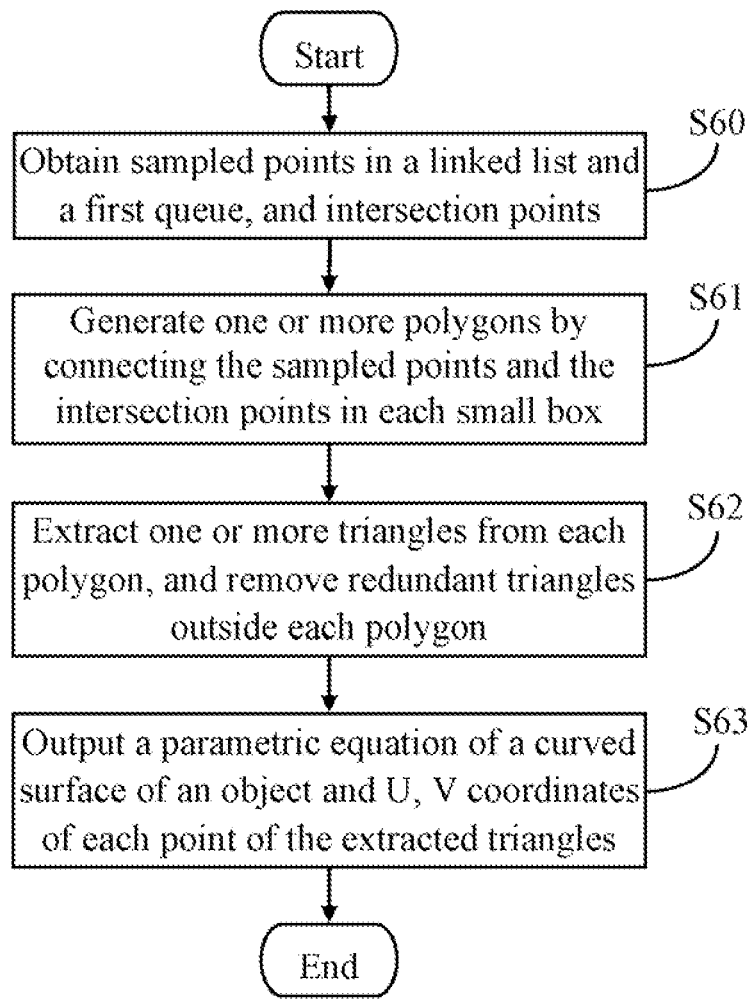
FIG. 12 is a detailed flowchart of block S6 in FIG. 3.

FIG. 12 is a detailed flowchart of block S6 in FIG. 3. Depending on the embodiment, additional blocks may be added, others removed, and the ordering of the blocks may be changed.

In block S60, the meshing module 205 obtains sampled points of the linked list and the first queue, and the intersection points in all of the small boxes.

Figure 13:
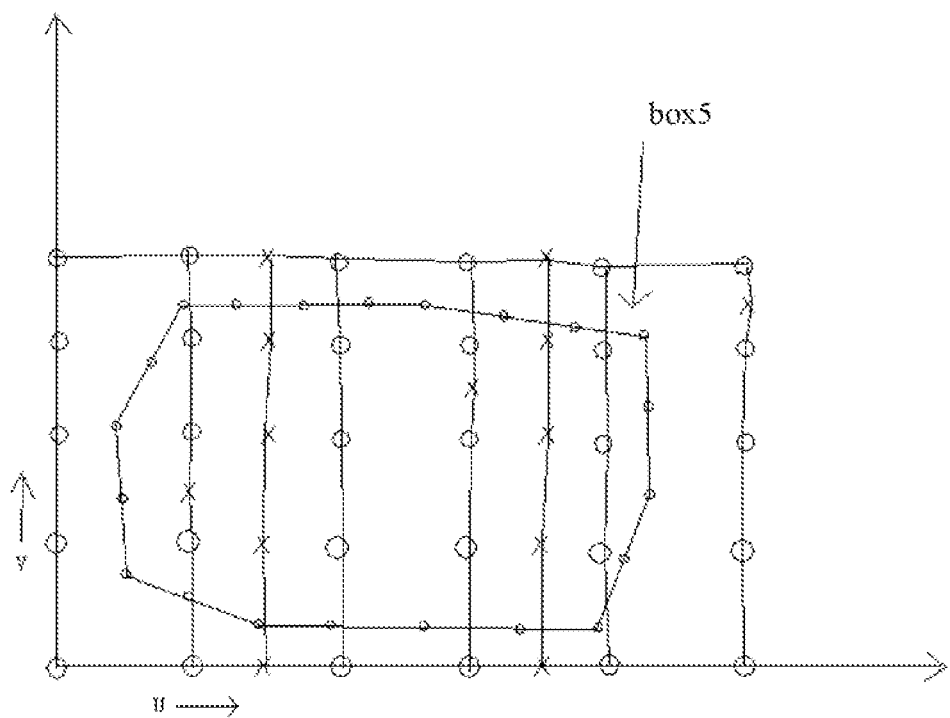
FIG. 13 and FIG. 14 are exemplary schematic diagrams showing the processing in block S6.
Figure 14:
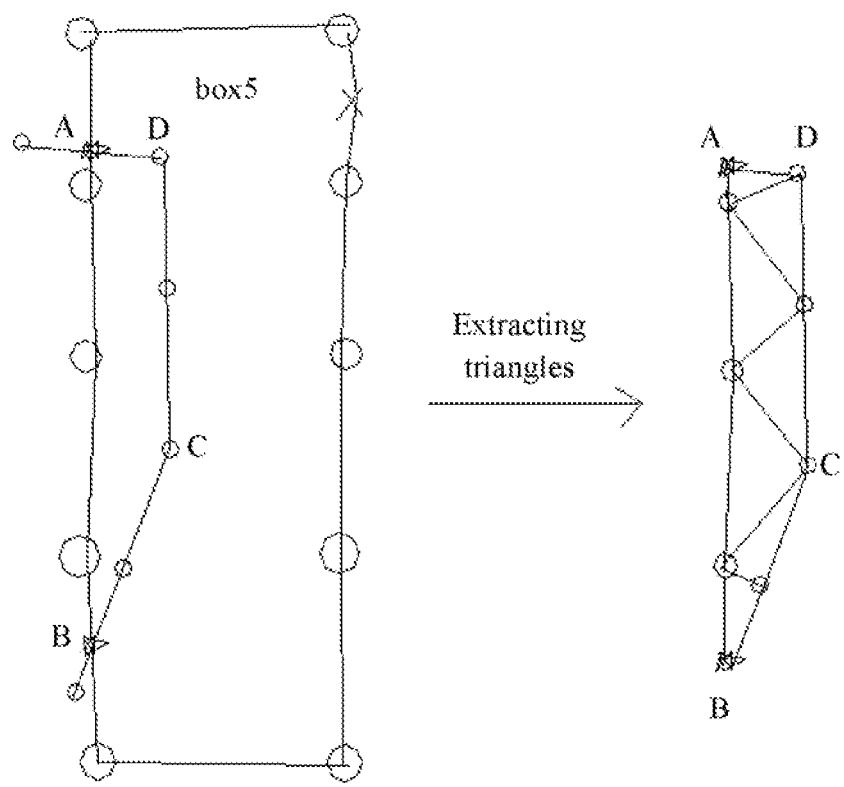

In block S61, the meshing module 205 generates one or more polygons by connecting the sampled points and the intersection points in each small box. For example, as shown in FIG. 13 and FIG. 14, supposing that the meshing module 205 has extracted the fifth small box "box5", then a polygon "ABCD" is obtained.

In block S62, the meshing module 205 extracts one or more triangles from each polygon, and removes any redundant triangles which are outside each polygon. For example, as shown in FIG. 14, the meshing module extracts one or more triangles inside the polygon "ABCD".

In block S63, the meshing module 205 outputs a parametric equation of the curved surface and the horizontal and vertical coordinates of each point (i.e., vertex) of the extracted triangles when all of the polygons have been processed. Then, the outputting module 206 maps all the 2D points on the triangles having horizontal and vertical (U, V) coordinates to 3D points having X, Y, Z coordinates, according to the parametric equation of the curved surface, and outputs a triangulated curved surface of the electronic model of the object on the display device 20, according to the X, Y, Z coordinates of the 3D points of each of the triangles.

It should be emphasized that the above-described embodiments of the present disclosure, particularly, any embodiments, are merely possible examples of implementations, set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure, and the present disclosure is protected by the following claims.

What is claimed is:

1. A computer-implemented method for meshing a curved surface of an electronic model of an object using an electronic device, the method comprising:
   obtaining sampled points of a boundary line of the electronic model of the object from a storage device of the electronic device;
   storing the sampled points of the boundary line in a linked list;
   obtaining sampled points of the curved surface of the electronic model of the object, and storing the sampled points of the curved surface in a first queue;
   inserting each of the sampled points stored in the linked list into the first queue, and dividing a parameter plane of the curved surface into a plurality of small boxes using vertical lines of the parameter plane;
   determining intersection points of the vertical lines of the parameter plane and the boundary line; and
   constructing a mesh of triangles of the curved surface of the electronic model of the object by connecting the intersection points, the sampled points of the boundary line and the curved surface in each of the small boxes.

2. The method according to claim 1, further comprising:
   mapping two dimensional (2D) points on the triangles having horizontal and vertical coordinates to three dimensional (3D) points having X, Y, Z coordinates, according to a parametric equation of the curved surface; and
   outputting a triangulated curved surface of the electronic model of the object on a display device of the electronic device, according to the X, Y, Z coordinates of the 3D points of each of the triangles.

3. The method according to claim 1, wherein the sampled points of the boundary line are obtained by:
   obtaining a 3D model of the object from the storage device;
   obtaining the boundary line of the object from the 3D model;
   fitting a curve according to points of the boundary line, and sampling points in the fitted curve;
   obtaining a connecting line between every two sampled points on the fitted curve, and calculating a first midpoint of the connecting line and a second midpoint between the two sampled points on the fitted curve;
   inserting the second midpoint into a second queue upon the condition that a distance between the first midpoint and the second midpoint is greater than a first preset value; and
   outputting points of the second queue when all of the sampled points of the fitted curve have been processed.

4. The method according to claim 3, wherein the linked list is created by:

obtaining points from the second queue;
creating a linked list according to a quantity of the obtained points;
obtaining an index of each of the obtained points in the second queue, and inserting the index into the linked list; and
converting the linked list into a circular listed list.

5. The method according to claim 1, wherein the first queue is created by:
determining sampling numbers along a horizontal direction and a vertical direction on the parameter plane of the curved surface;
obtaining sampled points along the horizontal direction and the vertical direction on the parameter plane according to the sampling numbers;
obtaining a connecting line between every two sampled points along the horizontal and vertical directions, calculating a third midpoint of the connecting line and a distance from the third midpoint to the curved surface;
determining a fourth midpoint between the two sampled points on the boundary line, and inserting the fourth midpoint into the first queue upon the condition that the distance is greater than a second preset value; and
outputting points of the first queue when all of the sampled points along the horizontal and vertical directions on the parameter plane have been processed.

6. The method according to claim 1, wherein the small boxes are obtained by:
obtaining the linked list and the first queue;
obtaining a maximal value $U_{max}$ and a minimal value $U_{min}$ along a horizontal direction on the parameter plane from the first queue, determining a sampling number $C_0$ along the horizontal direction on the parameter plane, calculating $(U_{max}-U_{min})/C_0=L_0$, determining a step-length along the horizontal direction by converting "$L_0$" into an integer "L" to, and dividing the parameter plane of the curved surface into a plurality of small boxes by vertical lines of the parameter plane according to the step-length;
obtaining a horizontal coordinate $U_0$ of each sampled point in the linked list, calculating $(U_0-U_{min})/L=P_0$, converting "$P_0$" into an integer "P", and locating a pointer of the sampled point to a position corresponding to the integer "P"; and
outputting sampled points in the linked list and the first queue when all of the sampled points in the linked list have been processed.

7. The method according to claim 1, wherein the triangles are generated by:
obtaining sampled points of the linked list and the first queue, and the intersection points in all of the small boxes;
generating one or more polygons by connecting the sampled points and the intersection points in each of the small boxes;
extracting one or more triangles from each polygon, and removing any redundant triangles which are outside each polygon; and
outputting a parametric equation of the curved surface and horizontal and vertical coordinates of each point of the extracted triangles when all of the polygons have been processed.

8. An electronic device, comprising:
a storage device;
at least one processor; and
one or more modules that are stored in the storage device and executed by the at least one processor, the one or more modules comprising:

a first sampling module that obtains sampled points of a boundary line of an electronic model of an object from the storage device, and stores the sampled points of the boundary line in a linked list;
a second sampling module that obtains sampled points of a curved surface of the electronic model of the object, and stores the sampled points of the curved surface in a first queue;
a processing module that inserts each of the sampled points stored into the linked list to the first queue, and divides a parameter plane of the curved surface into a plurality of small boxes using vertical lines of the parameter plane;
a calculating module that determines intersection points of the vertical lines of the parameter plane and the boundary line; and
a meshing module that construct a mesh of triangles of the curved surface of the electronic model of the object by connecting the intersection points, the sampled points of the boundary line and the curved surface in each of the small boxes.

9. The electronic device according to claim 8, wherein the one or more modules further comprise:
an outputting module that maps two dimensional (2D) points on the triangles having horizontal and vertical coordinates to three dimensional (3D) points having X, Y, Z coordinates, according to a parametric equation of the curved surface; and
outputs a triangulated curved surface of the electronic model of the object on a display device of the electronic device, according to the X, Y, Z coordinates of the 3D points of each of the triangles.

10. The electronic device according to claim 8, wherein the sampled points of the boundary line are obtained by:
obtaining a 3D model of the object from the storage device;
obtaining the boundary line of the object from the 3D model;
fitting a curve according to points of the boundary line, and sampling points in the fitted curve;
obtaining a connecting line between every two sampled points on the fitted curve, and calculating a first midpoint of the connecting line and a second midpoint between the two sampled points on the fitted curve;
inserting the second midpoint into a second queue upon the condition that a distance between the first midpoint and the second midpoint is greater than a first preset value; and
outputting points of the second queue when all of the sampled points of the fitted curve have been processed.

11. The electronic device according to claim 10, wherein the linked list is created by:
obtaining points from the second queue;
creating a linked list according to a quantity of the obtained points;
obtaining an index of each of the obtained points in the second queue, and inserting the index into the linked list; and
converting the linked list into a circular listed list.

12. The electronic device according to claim 8, wherein the first queue is created by:
determining sampling numbers along a horizontal direction and a vertical direction on the parameter plane of the curved surface;
obtaining sampled points along the horizontal direction and the vertical direction on the parameter plane according to the sampling numbers;
obtaining a connecting line between every two sampled points along the horizontal and vertical directions, calculating a third midpoint of the connecting line and a distance from the third midpoint to the curved surface;

determining a fourth midpoint between the two sampled points on the boundary line, and inserting the fourth midpoint into the first queue upon the condition that the distance is greater than a second preset value; and outputting points of the first queue when all of the sampled points along the horizontal and vertical directions on the parameter plane have been processed.

13. The electronic device according to claim 8, wherein the small boxes are obtained by:

obtaining the linked list and the first queue;

obtaining a maximal value $U_{max}$ and a minimal value $U_{min}$ along a horizontal direction on the parameter plane from the first queue, determining a sampling number $C_0$ along the horizontal direction on the parameter plane, calculating $(U_{max}-U_{min})/C_0=L_0$, determining a step-length along the horizontal direction by converting "$L_0$" into an integer "L", and dividing the parameter plane of the curved surface into a plurality of small boxes by vertical lines of the parameter plane according to the step-length;

obtaining a horizontal coordinate $U_0$ of each sampled point in the linked list, calculating $(U_0-U_{min})/L=P_0$, converting "$P_0$" into an integer "P", and locating a pointer of the sampled point to a position corresponding to the integer "P"; and outputting sampled points in the linked list and the first queue when all of the sampled points in the linked list have been processed.

14. The electronic device according to claim 8, wherein the triangles are generated by:

obtaining sampled points of the linked list and the first queue, and the intersection points in all of the small boxes;

generating one or more polygons by connecting the sampled points and the intersection points in each of the small boxes;

extracting one or more triangles from each polygon, and removing any redundant triangles which are outside each polygon; and outputting a parametric equation of the curved surface and horizontal and vertical coordinates of each point of the extracted triangles when all of the polygons have been processed.

15. A non-transitory storage medium having stored thereon instructions that, when executed by a processor of an electronic device, causes the electronic device to perform a method for meshing a curved surface of an electronic model of an object, the method comprising:

obtaining sampled points of a boundary line of the electronic model of the object from a storage device of the electronic device;

storing the sampled points of the boundary line in a linked list;

obtaining sampled points of the curved surface of the electronic model of the object, and storing the sampled points of the curved surface in a first queue;

inserting each of the sampled points stored into the linked list to the first queue, and dividing a parameter plane of the curved surface into a plurality of small boxes using vertical lines of the parameter plane;

determining intersection points of the vertical lines of the parameter plane and the boundary line; and constructing a mesh of triangles of the curved surface of the electronic model of the object by connecting the intersection points, the sampled points of the boundary line and the curved surface in each of the small boxes.

16. The non-transitory storage medium according to claim 15, wherein the method further comprises:

mapping two dimensional (2D) points on the triangles having horizontal and vertical coordinates to three dimensional (3D) points having X, Y, Z coordinates, according to a parametric equation of the curved surface; and outputting a triangulated curved surface of the electronic model of the object on a display device of the electronic device, according to the X, Y, Z coordinates of the 3D points of each of the triangles.

17. The non-transitory storage medium according to claim 15, wherein the sampled points of the boundary line are obtained by:

obtaining a 3D model of the object from the storage device;

obtaining the boundary line of the object from the 3D model;

fitting a curve according to points of the boundary line, and sampling points in the fitted curve;

obtaining a connecting line between every two sampled points on the fitted curve, and calculating a first midpoint of the connecting line and a second midpoint between the two sampled points on the fitted curve;

inserting the second midpoint into a second queue upon the condition that a distance between the first midpoint and the second midpoint is greater than a first preset value; and outputting points of the second queue when all of the sampled points of the fitted curve have been processed.

18. The non-transitory storage medium according to claim 17, wherein the linked list is created by:

obtaining points from the second queue;

creating a linked list according to a quantity of the obtained points;

obtaining an index of each of the obtained points in the second queue, and inserting the index into the linked list; and converting the linked list into a circular listed list.

19. The non-transitory storage medium according to claim 15, wherein the first queue is created by:

determining sampling numbers along a horizontal direction and a vertical direction on the parameter plane of the curved surface;

obtaining sampled points along the horizontal direction and the vertical direction on the parameter plane according to the sampling numbers;

obtaining a connecting line between every two sampled points along the horizontal and vertical directions, calculating a third midpoint of the connecting line and a distance from the third midpoint to the curved surface;

determining a fourth midpoint between the two sampled points on the boundary line, and inserting the fourth midpoint into the first queue upon the condition that the distance is greater than a second preset value; and outputting points of the first queue when all of the sampled points along the horizontal and vertical directions on the parameter plane have been processed.

20. The non-transitory storage medium according to claim 15, wherein the small boxes are obtained by:

obtaining the linked list and the first queue;

obtaining a maximal value $U_{max}$ and a minimal value $U_{min}$ along a horizontal direction on the parameter plane from the first queue, determining a sampling number $C_0$ along the horizontal direction on the parameter plane, calculating $(U_{max}-U_{min})/C_0=L_0$, determining a step-length along the horizontal direction by converting "$L_0$" into an integer "L", and dividing the parameter plane of the curved surface into a plurality of small boxes by vertical lines of the parameter plane according to the step-length;

obtaining a horizontal coordinate $U_0$ of each sampled point in the linked list, calculating $(U_0-U_{min})/L=P_0$, converting "$P_0$" into an integer "P", and locating a pointer of the sampled point to a position corresponding to the integer "P"; and outputting sampled points in the linked list and the first queue when all of the sampled points in the linked list have been processed.

* * * * *